Jan. 8, 1924. 1,480,244
U. H. CREMER
GUARD FOR HARVESTERS
Filed June 27, 1922
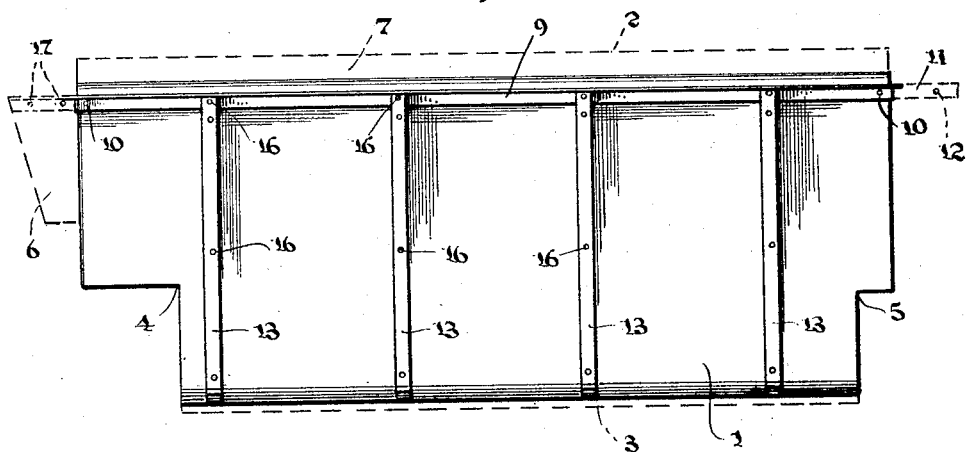
Fig. 1.
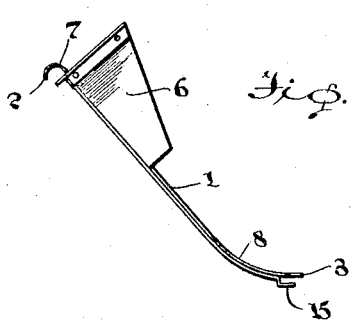
Fig. 2.
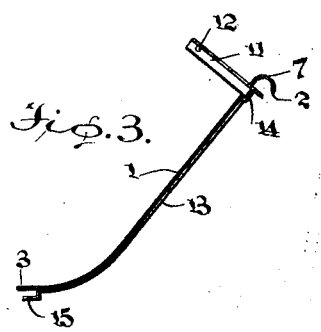
Fig. 3.
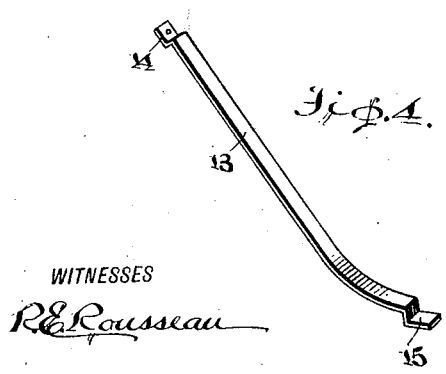
Fig. 4.
Fig. 5.
WITNESSES
R. E. Rousseau
INVENTOR
Udo H. Cremer,
BY
ATTORNEYS Patented Jan. 8, 1924.

1,480,244

UNITED STATES PATENT OFFICE.

UDO H. CREMER, OF MINONK, ILLINOIS, ASSIGNOR OF ONE-THIRD TO HERMAN F. CREMER AND ONE-THIRD TO FRED H. CREMER, BOTH OF MINONK, ILLINOIS.

GUARD FOR HARVESTERS.

Application filed June 27, 1922. Serial No. 571,130.

*To all whom it may concern:*

Be it known that I, UDO H. CREMER, a citizen of the United States, and a resident of Minonk, in the county of Woodford and State of Illinois, have invented certain new and useful Improvements in Guards for Harvesters, of which the following is a specification.

My invention is a guard for harvesters, which bind the cut grain in the fields, and it consists in the combinations, constructions and arrangements herein described and claimed.

More particularly, my invention is an attachment for a harvester binder adapted for use in the harvesting of oats or like grains, to prevent corn stalks and corn stubbles from being drawn in under the canvas of the binder upon the conveyor of the harvester.

As is well known, in harvesting oats in a field in which corn was grown during the preceding season, the corn stalks and stubble remaining in the field are drawn into and between the canvas of harvesters of ordinary construction and the platform of the harvester, thus clogging the harvester and making necessary the cessation of the binding operation while the corn stalks or the like are being removed from the binder. As a consequence, considerable time and labor are wasted and the canvas of the harvester binder is frequently torn when the corn stalks or the like are disengaged therefrom.

It is therefore an object of my invention to provide a simple and economical attachment which can be readily applied to a binder of a well known type of construction to prevent entrance of corn stalks into the intake part of the binder, and which can be operatively applied to harvester binders of various types of construction without extensive or material changes being required in the construction of the attachment.

Other objects and advantages will be apparent from the following description, and the novel features of the invention will be particularly outlined in the appended claim.

My invention is illustrated in the accompanying drawings, forming a part of this application, in which:

Fig. 1 is a face view of a guard embodied in my invention, the portions thereof indicated by the dash lines being shown in more or less developed position, Fig. 2 is an elevation of the embodiment of the invention, looking at one end thereof, Fig. 3 is a view similar to Fig. 2, looking at the other end of the device, Fig. 4 is a perspective view showing one of the stiffening and holding elements comprised in the device, and Fig. 5 is an enlarged sectional view through a fragmentary portion of the device.

In carrying out my invention, I provide a substantially flat body 1 which is preferably made of sheet metal and is substantially rectangular in contour, having parallel longitudinal edges 2 and 3 respectively and having the corner portions thereof which are partially defined by the edge 3, cut away as indicated at 4 and 5 respectively. The body 1 includes an integral end extension 6 which extends from one end of the body 1 in the plane of the latter intermediate of the cut away portion 4 and edge 2.

The body 1 is bent or curved near the edge 2 in the arc of a circle about a line parallel to the body 1 and adjacent thereto, the arc extending to the edge 2 to provide a hook portion which is indicated at 7 in Figs. 1, 2 and 5 of the drawings. The body 1 is curved or bent from a line parallel with the edge 3 reversely to the curvature of the hook portion 7 in the arc of a circle having a radius considerably longer than that about which the arc of the hook portion 7 is described, the curved portion adjacent to the edge 3 being indicated at 8. The end or wing extension 6 is then bent at right angles to the body 1 to extend from the same side of the latter as the hook portion 7.

A reinforcing element in the form of an angle iron 9 is secured by rivets 10 or the like to the body 1 and to the wing extension 6 thereof to extend longitudinally of the body from the end edge of the wing extension 6 along the edge thereof parallel to the edge 2 of the body and along the body in parallel relation to the edge beyond the end of the body remote from the wing 6. The portion of the reinforcing element 9 that extends beyond the end of the body remote from the wing extension 6 is indicated at 11 and is bent at right angles to the body and parallel to the wing extension 6 to provide an attaching portion. A bolt or screw-receiving opening 12 is provided through the attaching portion 11.

The body 1 is additionally reinforced by a plurality of transversely extending flat metal bars, each of which has the extreme end portions thereof offset as indicated at 14 and 15 respectively and is bent for the remainder of its length to lie clockwise against one face of the body 1. The offset portions 14 are adapted to lie snugly upon the underlying portion of the longitudinal reinforcing member 9, while the offset portions 15 are spaced from the body 1 adjacent to the edge 3 of the latter for a purpose which will be hereinafter set forth. Rivets 16 or the like are employed to secure the reinforcing members and the offset portions 14 thereof to the body 1, the rivets or other fastening elements extending through the offset portions 14 also serving to secure the longitudinal reinforcing member 9 to the body 1.

From the foregoing description of the various parts of the device, the operation thereof may be readily understood. A guard having the organization and form described, is adapted for attachment to a harvester of a well known type of construction without any changes being made in the usual construction of the harvester and is adapted to fit between the frame of the harvester and the platform of the latter. The guard may be attached to the frame of the binder with bolts ordinarily provided on the binder, which bolts are projected through openings in the attaching portion 11 and through the rivet or bolt-receiving openings 17, of the reinforced wing extension 6. The edge portion 3 and the offset portion 15 of the reinforcing bars 13 will straddle the edge portion of one of the sides of an angle iron (not shown) that is ordinarily provided on the platform of a harvester or binder of the type of construction indicated, whereby the body 1 of the guard and the wing extension 6 thereof will be releasably held in position to prevent cornstalks or the like from being drawn into and between the canvas and the platform of the harvester when the latter is being used in the harvesting of oats or like grain in the fields. The cut away portions 4 and 5 are provided to receive protruding portions of the harvester.

The harvester for which the particular embodiment of the invention illustrated is adapted, has not been shown in the drawings since it is thought that such an illustration is not necessary for an understanding of the application of the attachment, which is complete in itself and is adapted for attachment to harvesters of other types of construction than that indicated without any extensive or material changes in the construction of the attachment being required.

Obviously, my invention is susceptible of embodiment in forms other than those illustrated in the accompanying drawings, and I therefore consider as my own all modifications of the forms of the device disclosed herein, which fairly fall within the scope of the appended claim.

I claim:—

As an article of manufacture, an attachment for harvesters comprising a substantially flat body having parallel longitudinal edges and having a wing extension at one end thereof, said extension being bent at right angles to the body, the longitudinal edge portions of the body being reversely curved and one of said curved longitudinal edge portions constituting a hook, a longitudinal reinforcing element secured to the body and to the wing extension and extending beyond the end of the body remote from the wing extension, said extending portion of the reinforcing element being bent into parallel relation to the wing portion, said reinforced wing portion of the body and said extending portion of the reinforcing element being provided with openings to receive fastening elements whereby the body may be secured to the frame of a harvester, and a plurality of transversely extending reinforcing elements secured to the body and having offset end portions spaced from the second longitudinal edge portion of the body to cooperate with the latter in engaging a fixed part of the harvester, as and for the purpose set forth.

UDO H. CREMER.